US005718797A

United States Patent [19]

Phillips et al.

[11] Patent Number: 5,718,797

[45] Date of Patent: Feb. 17, 1998

[54] APPARATUS FOR MANUFACTURING GYPSUM BOARD

[75] Inventors: John L. Phillips, Vacaville, Calif.; Herman C. Fraley, Amherst, Ohio

[73] Assignee: National Gypsum Company, Charlotte, N.C.

[21] Appl. No.: 594,484

[22] Filed: Jan. 31, 1996

Related U.S. Application Data

[63] Continuation of Ser. No. 248,664, May 25, 1994, abandoned.

[51] Int. Cl.[6] .......... B32B 13/00

[52] U.S. Cl. .......... 156/346; 118/118; 118/262; 156/44

[58] Field of Search .......... 156/39, 43, 44, 156/346, 347, 348; 118/33, 34, 117, 118, 249, 262, 405, 415, 424; 427/172, 176, 285, 361, 365, 369, 428, 434.3

[56] References Cited

U.S. PATENT DOCUMENTS

| | | | |
|---|---|---|---|
| 1,489,693 | 4/1924 | Brookby . | |
| 1,511,500 | 10/1924 | Brookby . | |
| 1,578,250 | 3/1926 | Armstrong . | |
| 1,597,623 | 8/1926 | Schumacher . | |
| 1,859,853 | 5/1932 | Thomson . | |
| 1,901,080 | 3/1933 | Bradner | 118/405 |
| 1,953,589 | 4/1934 | Camp | 156/346 |
| 1,975,195 | 10/1934 | Dennison | 427/176 |
| 2,015,531 | 9/1935 | Montgomery | 118/405 |
| 2,213,249 | 9/1940 | Kelley . | |
| 2,762,738 | 9/1956 | Teale . | |
| 2,861,009 | 11/1958 | Rubner | 118/415 |
| 2,940,505 | 6/1960 | Brothers . | |
| 2,954,302 | 9/1960 | Gorman, Jr. . | |
| 2,985,219 | 5/1961 | Summerfield . | |
| 3,017,305 | 1/1962 | Dailey . | |
| 3,076,430 | 2/1963 | Bruce | 118/415 |
| 3,462,341 | 8/1969 | Littin . | |
| 3,463,685 | 8/1969 | Elsevier et al. . | |
| 3,473,955 | 10/1969 | Moriarty | 427/172 |
| 3,516,882 | 6/1970 | Cummisford . | |
| 3,532,576 | 10/1970 | Proctor et al. | 156/348 |
| 3,607,486 | 9/1971 | Jacks et al. . | |
| 3,832,250 | 8/1974 | Pearson . | |
| 4,156,615 | 5/1979 | Cukier . | |

(List continued on next page.)

FOREIGN PATENT DOCUMENTS

| | | | |
|---|---|---|---|
| 571770 | 4/1959 | Belgium | 118/117 |
| 769414 | 3/1957 | United Kingdom . | |
| 772581 | 4/1957 | United Kingdom . | |

OTHER PUBLICATIONS

"CD Ceiling Board" by Gypsum Domtar (no date).

*Primary Examiner*—Steven D. Maki
*Attorney, Agent, or Firm*—Marshall, O'Toole, Gerstein, Murray & Borun

[57] ABSTRACT

Apparatus and method for producing gypsum board, comprising apparatus for coating a cover sheet with a relatively high density gypsum slurry, apparatus for forming edge borders on the sheet with relatively high density gypsum slurry, and apparatus for forming a core on the coating and between the edge borders, the core comprising a relatively low density gypsum. The apparatus for coating the sheet comprises a relatively soft pressure roll and a relatively hard coating roll, the two rolls being normally pressed together to form a nip between them and a sheet to be coated passing through the nip. The pressure roll is below the sheet and the coating roll, and the axis of the pressure roll is offset from the axis of the coating roll in upstream direction of the movement of the sheet. The pressure roll has a surface area which contacts and moves in the same direction as the sheet, and the coating roll has a surface area which contacts and moves in the opposite direction of the sheet. A trough is formed between the upper side of the sheet and the coating roll, and a relatively high density gypsum is poured into the trough. The rotating coating roll picks up a quantity of the slurry from the trough and wipes it onto the sheet to form a high density gypsum coating.

13 Claims, 2 Drawing Sheets

U.S. PATENT DOCUMENTS 4,177,304 12/1979 Berry .................................. 427/434.3
4,279,673 7/1981 White et al. .
4,288,263 9/1981 Delcoigne et al. .
4,298,394 11/1981 Leeming et al. .
4,298,413 11/1981 Teare .
4,327,146 4/1982 White .
4,351,867 9/1982 Mulvey et al. .
4,354,885 10/1982 White .
4,618,370 10/1986 Green et al. .
4,699,822 10/1987 Shu .
5,085,929 2/1992 Bruce et al. .
5,116,671 5/1992 Bruce et al. .

FIG. 2
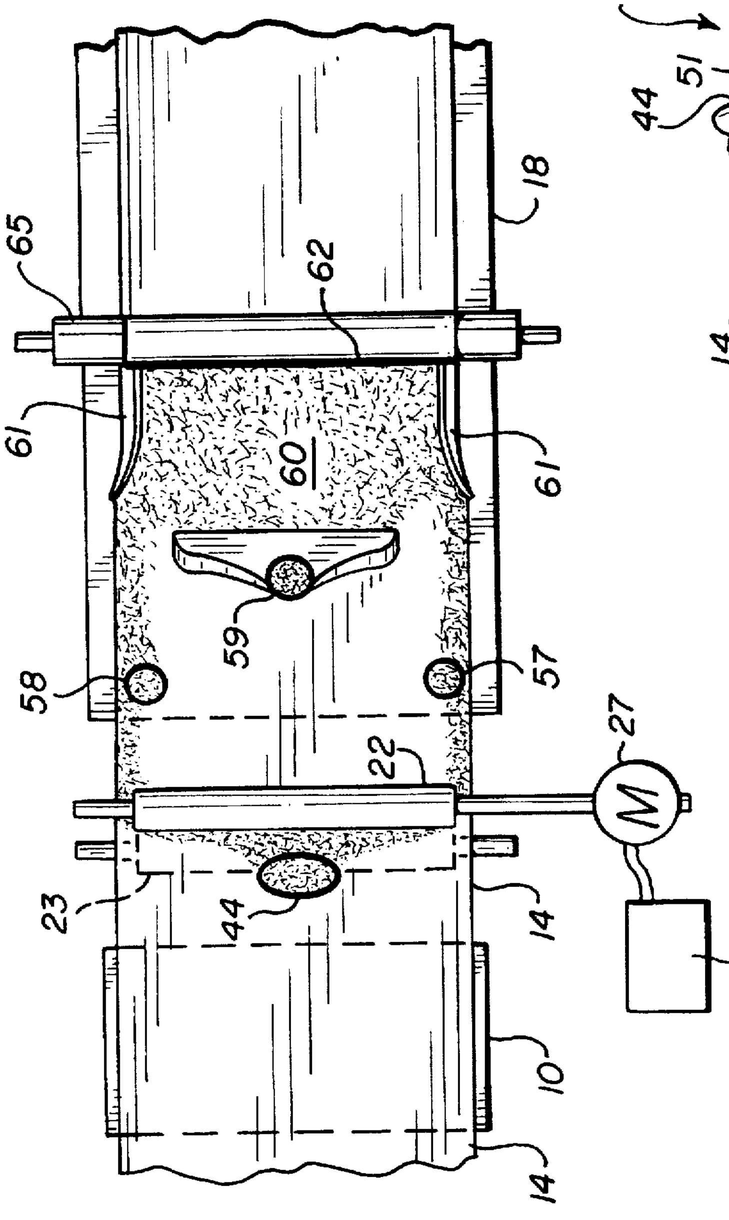
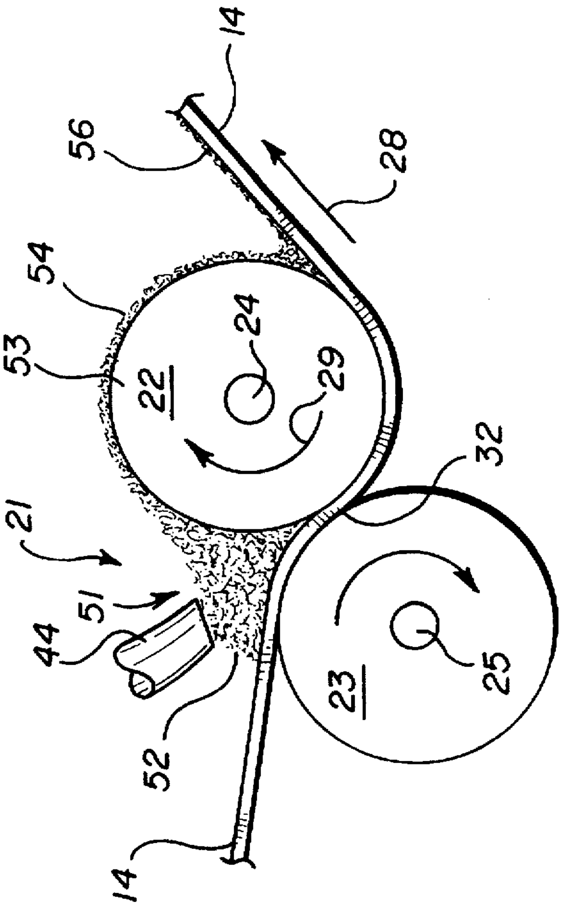
FIG. 3

APPARATUS FOR MANUFACTURING GYPSUM BOARD

RELATED APPLICATIONS

This application is a continuation of application Ser. No. 08/248,664, filed May 25, 1994 and titled "Apparatus For Manufacturing Gypsum Board", now abandoned.

FIELD AND BACKGROUND OF THE INVENTION

This invention relates to gypsum board, and more specifically to apparatus and method for coating a cover sheet of gypsum board, and to the board produced thereby.

Gypsum board is well known and widely used in the construction industry. A typical sheet of gypsum wallboard comprises a gypsum core, a back cover sheet on one side of the core and a face or front cover sheet on the other side of the core. The face cover sheet is folded around the long edges of the core and overlaps the side edges of the back cover sheet.

To reduce the weight of the core, it has been common practice to introduce small bubbles into the gypsum to produce a foamed gypsum core. This has been done, for example, by adding a foaming agent to the gypsum slurry. However, a core formed entirely of foamed gypsum has two disadvantages. First, the foamed gypsum core, when set or cured, is relatively fragile and tends to crack and crumble when a nail is driven through it during installation. Second, the foamed gypsum core does not always adhere to the cover sheets as well as desired.

To avoid the first problem mentioned above, it has been common practice to provide unfoamed gypsum along the long edges of the board. The unfoamed gypsum along the edges is denser and harder than the foamed gypsum, and the "hard edges" are stronger and less easily fractured. The second problem has been more difficult to resolve. Starch has been added to the gypsum slurry to produce better adherence with the cover sheets. Another solution has been to coat the cover sheets to produce better adhesion.

The White U.S. Pat. No. 4,327,146 describes a method of coating a cover sheet with a defoaming agent which acts to remove the foam bubbles from the gypsum at the core-sheet interface. The defoamed gypsum adheres well to the cover sheets.

The Brookby U.S. Pat. No. 1,511,500 describes a method of coating a cover sheet with a "normal" gypsum and water mixture, and then forming a core layer of gypsum having an expanded cellular body.

The R. Bruce U.S. Pat. Nos. 5,085,929 and 5,116,671 describe a method of producing a foamed gypsum slurry using a foaming agent which is added to the gypsum. According to these patents, the foaming agent produces a high density slurry at the interface with the cover sheets, and the high density slurry purportedly adheres well to the paper.

Other U.S. patents of possible interest are U.S. Pat. Nos. 2,954,302, 3,516,882, and 3,607,486.

It is a general object of the present invention to provide an improved apparatus and method for coating cover sheets with a relatively high density gypsum slurry, and to an improved gypsum board produced thereby.

SUMMARY OF THE INVENTION

Apparatus and method in accordance with the invention for producing gypsum board, comprises apparatus for coating a cover sheet with a relatively high density gypsum slurry, apparatus for forming edge borders on the sheet with relatively high density gypsum slurry, and apparatus for forming a core on the coating and between the edge borders, the core comprising a relatively low density gypsum.

The apparatus for coating the sheet comprises a relatively soft pressure roll and a relatively hard coating roll, the two rolls being normally pressed together to form a nip between them and a sheet to be coated passing through the nip. The pressure roll is below the sheet and the coating roll, and the axis of the pressure roll is offset from the axis of the coating roll in upstream direction of the movement of the sheet. The pressure roll has a surface area which contacts and moves in the same direction as the sheet, and the coating roll has a surface area which contacts and moves in the opposite direction of the sheet. A trough is formed between the upper side of the sheet and the coating roll, and the relatively high density gypsum is poured into the trough. The rotating coating roll picks up a quantity of the slurry from the trough and wipes it onto the sheet to form a high density gypsum coating, and the coating roll is wiped clean by the sheet which is pressed against the coating roll by the pressure roll.

The apparatus for forming the edge portions comprises means for supplying streams of a relatively high density gypsum slurry to the borders of the sheet, the streams merging and being continuous with the gypsum coating.

The apparatus for forming the core comprises means for providing a relatively low density gypsum slurry over the coating and between the borders.

The invention further comprises a gypsum board comprising a first cover sheet, a coating of relatively high density gypsum on said first cover sheet, borders of relatively high density gypsum along the edge portions of said first cover sheet, the borders merging and being continuous with the coating, a core of relatively low density gypsum covering said coating between said borders, and a second cover sheet over said core and said borders.

BRIEF DESCRIPTION OF THE DRAWINGS

The invention will be better understood from the following detailed description taken in conjunction with the accompanying drawings, wherein:

FIG. 2 is a view taken along the line 2—2 of FIG. 1;

FIG. 3 is an enlarged fragmentary view of a portion of the machine shown in FIG. 1.

DETAILED DESCRIPTION OF THE DRAWINGS

Figures 1, 4:
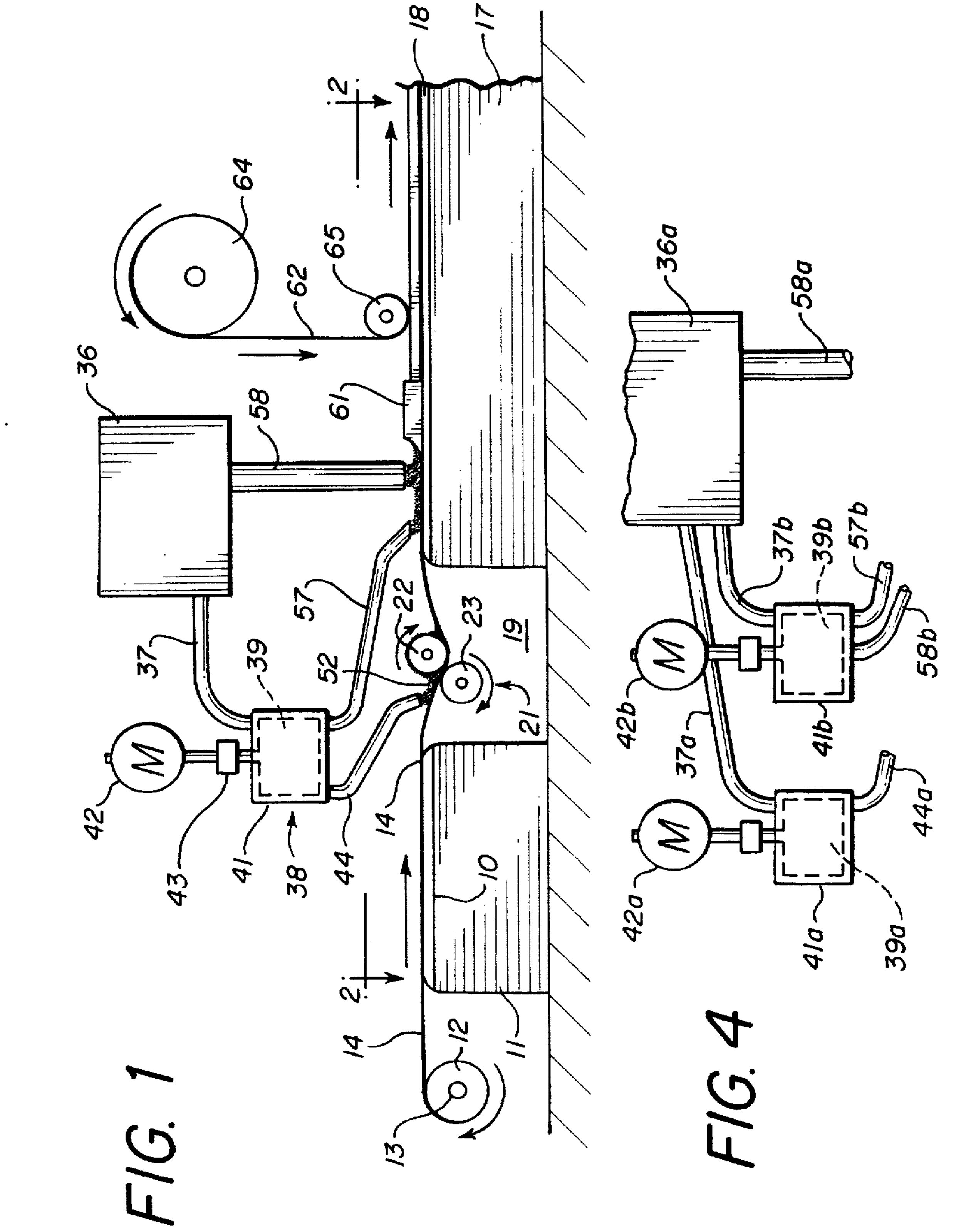
FIG. 1 is a schematic representation of a machine constructed in accordance with the present invention.
FIG. 4 is a fragment of a machine constructed in accordance with an alternative embodiment of the invention.

The machine shown in FIGS. 1 and 2 comprises a flat deck or plate 10 mounted on a frame 11. A supply roll 12 is rotatably mounted adjacent the deck 10 on a shaft 13 and supplies a first cover sheet 14. From the roll 16, the sheet 14 moves downstream (toward the right as seen in FIG. 1) across the upper surface of the deck 10.

Spaced downstream from the deck 10 is a second frame 17 and deck 18, a deck cut-out or gap 19 being formed between the two decks 10 and 18.

A typical finished sheet of gypsum wallboard is four feet wide, and the widths of the sheet 14 and the two decks 10 and 18 are slightly wider than the finished sheet, as is well known in the industry. In the finished product, the sheet 14 forms the front or viewed face of the gypsum board.

Mounted in the gap 19, between the two decks, is apparatus 21 for coating the upper surface (as seen in FIG. 1) of the cover sheet 14, the coating apparatus 21 comprising a coating roll 22 and a pressure roll 23 (see in particular FIG. 3). The transport path for the sheet 14 leads from the deck 10, over the top of the compression roll 23, loops underneath the coating roll 22 as shown in FIGS. 1 and 3, and to the top of the deck 18. The two rolls 22 and 23 are respectively mounted on axles 24 and 25; the compression roll 23 is not motor driven and its surface speed is essentially the same as that of the cover sheet 14. The coating roll 22, however, is driven by a motor 27 (see FIG. 2) and its surface moves opposite the direction of the sheet 14, as indicated by the directional arrows 28 and 29 in FIG. 3. A power supply and motor speed controller 31 is connected to drive the motor 27.

The compression roll 23 is a relatively soft roll and may be made, for example, of sponge rubber. The coating roll 22, on the other hand, is hard and highly polished, and may, for example, be a polished chromed roll. The two rolls are pressed toward each other and form a nip 32 between them. The sheet 14 moves through the nip 32 and its upper surface wipes across the under surface of the coating roll 22. The sheet 14 is looped under the coating roll 22 and is pulled tightly across the underside of the roll 22, and since the surfaces move in opposite directions, the surface of the roll 22 is wiped clean by the sheet 14. During operation, it is important that the roll 22 not stop rotating.

Mounted above the decks 10 and 11 is a main mixer 36 (see FIG. 1) which contains a quantity of foamed gypsum slurry. The slurry may have a conventional composition which includes gypsum, water, a foaming agent, stabilizers, etc., forming a relatively low density gypsum slurry. The density, of course, is low because of the foam or air bubbles in the slurry.

A duct or conduit 37 leads from the main mixer 36 to a high-speed beater 38 which includes a vaned member 39 rotatably mounted in a housing 41. An electric motor 42 is connected by a clutch 43 to rotate the vaned member 39 at high speed. Another duct 44 leads from the beater 38 to the coating apparatus 21. Foamed slurry from the main mixer 36 flows through the duct 37 to the high speed beater 38, and the rapidly turning vanes 39 remove most of the air bubbles from the slurry by beating the slurry. Consequently, the slurry flowing through the duct 44 to the coating apparatus comprises a substantially defoamed (or relatively high density) gypsum slurry.

The high speed beater 38 may be similar to conventional beaters presently used to form a defoamed slurry that is located along the long side edges (the "hard edges") or margins of gypsum wallboard.

With specific reference to FIG. 3, the coating roll 22 of the coating apparatus 21 has its axle 24 offset upwardly and downstream (in the direction of movement of the sheet 14) relative to the axle 25 of the pressure roll 23. In the specific example of the invention described herein, a line drawn through the two axles 24 and 25 makes an angle of substantially 45° with a horizontal line, and each of the rolls 22 and 23 have diameters of six and four inches respectively. Due to the offset of the axles, an upwardly opening trough or valley 51 is formed between the upper side of the sheet 14 and the coating roll 22, and the duct 44 is located to pour a quantity of the defoamed slurry 52 into the trough 51. The slurry 52 flows laterally from the duct 44 and fills the trough over the length of the roll 22. As the roll 22 rotates clockwise (as seen in FIG. 3), the surface 53 of the roll 22 picks up a coating 54 of the slurry 52, and the coating 54 is wiped off the roll 22 by the sheet 14. The sheet 14 is pulled downstream by a conventional drive mechanism (not illustrated), and the sheet is pulled tightly against the underside of the roll 22. Further, the soft pressure roll 23 presses the sheet tightly against the roll 22. The sheet 14 moves opposite the direction of the surface 53 of the roll 22 as previously mentioned and the paper wipes clean the surface of the roll 22. As a consequence, the coating 54 is transferred to the sheet 14 and forms a substantially uniform coating or layer 56 across center area of the sheet. The thickness of the coating 56 depends upon the rate of movement of the sheet relative to the rate of rotation of the roll 22, and the controller 31 is preferably adjusted to produce a coating having a thickness of approximately 1/16" to 1/8".

As shown in FIG. 2, the axial lengths of the two rolls 22 and 23 is slightly less than the width of the sheet 14. For example, in the production of 4 by 8 feet gypsum wallboard, the rolls 22 and 23 may be 45 inches long. Consequently, a sheet 14 of conventional width paper extends beyond the ends of the roll 22, and some of the slurry 52 in the trough 51 flows around the ends of the roll 22 and onto the edge portions or borders of the sheet 14.

The coated sheet 14 is moved along the transport path onto the deck 18, and additional high density slurry is poured onto the borders of the sheet 14 to form the hard edges. Two ducts 57 and 58 (FIGS. 1 and 2) extend from the high speed beater 38 downwardly to just above the borders of the sheet 14, and they form layers of high density slurry along the borders. The slurry of these two layers has the same composition and density as the slurry forming the coating 56, and the slurry of the borders merges and is continuous with the slurry of the coating 56 and the portions of the slurry 52 which flows around the ends of the roll 22.

The gypsum core 60 of the board is formed by the foamed gypsum from the main mixer 36 which flows through a duct 59 to the center area of the coated sheet 14. As illustrated in FIG. 2, the slurry flows and spreads out across the sheet 14 on top of the coating 56 and between the layers of slurry at the borders of the sheet.

Conventional folding shoes 61 at the sides of the deck 18 along the borders of the sheet fold the borders upwardly and then down on top of the high density layers of slurry, the shoes 61 forming opposing long side edges of the finished board. A second cover sheet 62 is then laid over the core 60 and the borders of the first cover sheet 14. The second cover sheet 62 is unreeled from a supply roll 64 and passed under an idler roll 65 which guides the cover sheet 62, smooths the upper surface of the slurry, and reduces the slurry thickness to the desired value. In the finished product, the first sheet 14 normally forms the front face of the wallboard and the second sheet 62 normally forms the back face or side of the board.

Following the laying down of the second cover sheet 62, the board is processed in the customary manner. The two cover sheets and the slurry are moved along the deck 18 until the slurry has set to the point where the board can be handled. Then the board is cut to the desired length, turned over, and then moved through a kiln (not shown).

The coating of the high density gypsum slurry has excellent adhesion with the first sheet 14, and the coating adheres to the low density gypsum core; since the coating 56 and the hard edge layers merge and are formed from the same supply, the adhesion is continuous and consistent across the front face of the board.

As previously mentioned, the rate of rotation of the coating roll 22 should be carefully controlled to produce the desired thickness of the layer 56, and it is important that the roll 22 be driven with sufficient torque to prevent it from stopping during operation. It is also important that the compression roll 23 presses against the sheet 14 and the roll 22 and that the sheet 14 is pulled tightly across the underside of the coating roll 22, so that the roll 22 is cleaned by the sheet 14.

In a specific example of a machine in accordance with this invention, the rolls 22 and 23 are about 6 and 4 inches respectively in diameter, the space 19 between the two decks 10 and 18 is about 27 inches, the bottom of the coating roll 22 is about 1 inch below the surface of the deck 18, the rolls 22 and 25 are about 45 inches long, and the hose 37 has a diameter of about 1.25 inches. The compression roll 23 is preferably sufficiently soft that it will allow any lumps to pass because a lump could break in the cover sheet 14. The coating roll 22 is preferably mounted such that it will automatically move away from the compression roll 23 in case a person has his/her fingers caught between the rolls. For example, the roll 22 may be mounted on pivotable arms which are counterweighted to move the roll 22 up if it meets an obstruction.

FIG. 4 shows an alternative arrangement wherein separate high speed mixers or beaters are provided for feeding the coating apparatus and the hard edge forming apparatus. A hose or duct 37*a* conveys low density slurry from a main mixer 36*a* to a high speed beater 41*a*, and a duct 44*a* conveys the resulting high density slurry to the coating apparatus (see FIGS. 1 to 3). A separate duct 37*b* conveys low density slurry to a second high speed beater 41*b*, and two ducts 57*b* and 58*b* convey the high density slurry to the borders of the sheet. In other respects, the system of FIG. 4 is similar to that shown in FIGS. 1 to 3.

In the systems shown in FIGS. 1 to 4, a central mixer 36 (or 36*a*) forms a single source for the slurry used for the coating 56, the hard edge portions, and the core. Instead, separate supplies could be provided for the three functions, or, for example, one supply could be provided for the core and a separate supply could be provided for the coating and the hard edges.

What is claimed is:

1. In a machine for manufacturing gypsum board formed by a layer of gypsum covered on at least one side by a cover sheet, the machine including means forming a transport path for movement of the cover sheet from an upstream end toward a downstream end of the machine and including means for forming the layer of gypsum on the cover sheet, the improvement comprising apparatus for coating a side of the cover sheet with slurry prior to forming the layer of gypsum on the cover sheet, said apparatus comprising:
   a) a coating roll having a smooth cylindrical surface, said coating roll having an axis of rotation and being rotatably mounted adjacent said transport path and, during operation of the machine, the cover sheet looping about a portion of said coating roll, a trough being formed between said cover sheet and said one side of said coating roll and said trough being toward said upstream end, and pressure means for pressing said cover sheet tightly against said one side of said coating roll, said pressure means comprising a rotatable pressure roll having an axis substantially parallel to the axis of rotation of the coating roll, a plane extending through said axes making an acute angle with a horizontal plane, said axis of said coating roll being spaced in a downstream direction from said axis of said pressure means;
   b) drive means for rotating said coating roll such that said surface of said coating roll moves opposite the direction of movement of the cover sheet and said one side of said coating roll is wiped clean by said cover sheet; and
   c) slurry supply means for, during operation of the machine, pouring a quantity of slurry into said trough, said quantity being in contact with said coating roll but insufficient to spill over said coating roll;
   d) whereby said rotation of said coating roll during operation causes said coating roll to pick up a coating of said slurry and to wipe said coating on said cover sheet.

2. Apparatus as set forth in claim 1, wherein said surface of said coating roll is relatively hard and polished, and said pressure roll has a relatively soft outer surface.

3. Apparatus as set forth in claim 1, wherein said acute angle is substantially 45°.

4. Apparatus as set forth in claim 1, wherein said slurry supply means conveys a relatively high density slurry to said trough.

5. Apparatus as set forth in claim 4, wherein said slurry supply means comprises a high speed beater for removing air bubbles from a foamed gypsum slurry.

6. Apparatus as set forth in claim 5, and further comprising second means for supplying a relatively low density gypsum slurry to a center area of said cover sheet toward said downstream end from said coating roll to form said layer of gypsum, said second means further being connected to supply said relatively low density gypsum slurry to said high speed beater.

7. Apparatus as set forth in claim 5, and further comprising conduit means connected to said high speed beater for supplying said relatively high density gypsum slurry to the side borders of said cover sheet.

8. A machine for manufacturing gypsum board including a core of gypsum covered on at least one side by a cover sheet, said machine comprising deck means for supporting a cover sheet, said deck means having an upstream end and a downstream end, a paper supply and transport path for movement of a cover sheet across said deck means from said upstream end toward said downstream end, a coating roll rotatably mounted adjacent the cover sheet and said coating roll having a side thereof in tight engagement with a surface of the cover sheet, the cover sheet looping about a portion of the coating roll, a trough being formed between the cover sheet and said coating roll upstream of said coating roll, said coating roll having a smooth cylindrical surface, a rotatable pressure roll for pressing said cover sheet tightly against said side of said coating roll, said coating roll and said pressure roll each having an axis of rotation, a plane extending through said axes making an acute angle with a horizontal plane, said axis of said coating roll being spaced in a downstream direction from said axis of said pressure roll, drive means for rotating said coating roll in the direction that said cylindrical surface moves opposite the direction of movement of said cover sheet, whereby said side of said coating roll and said cover sheet in contact therewith are wiped clean, first slurry supply means for pouring a quantity of gypsum slurry into said trough to a depth which is below the top of said coating roll, whereby rotation of said coating roll carries a coating of the gypsum slurry over the top of said coating roll and wipes said coating onto said cover sheet, and second slurry supply means for pouring a gypsum slurry onto said cover sheet over said coating.

9. A machine as set forth in claim 8, wherein said pressure roll is relatively compressible.

10. A machine as set forth in claim 9, wherein said surface of said coating roll is hard and highly polished.

11. A machine as set forth in claim 8, wherein said first slurry supply means pours a relatively high density slurry into said trough, and said second slurry supply pours a relatively low density slurry onto said cover sheet.

12. A machine as set forth in claim 11, wherein said first slurry supply means further pours said relatively high density slurry along side borders of said cover sheet.

13. A machine as set forth in claim 8, wherein said deck means comprises a first deck and a second deck, said first and second decks being separated by a gap, and said coating roll and said pressure roll being mounted in said gap.

* * * * *